US 9,235,699 B2

(12) United States Patent
Kwak

(10) Patent No.: US 9,235,699 B2
(45) Date of Patent: Jan. 12, 2016

(54) COMPUTER SYSTEM AND METHOD OF CONTROLLING COMPUTER

(75) Inventor: Woon-geun Kwak, Seongnam-si (KR)

(73) Assignee: SAMSUNG ELECTRONICS CO., LTD.., Suwon-Si (KR)

( * ) Notice: Subject to any disclaimer, the term of this patent is extended or adjusted under 35 U.S.C. 154(b) by 578 days.

(21) Appl. No.: 13/074,174

(22) Filed: Mar. 29, 2011

(65) Prior Publication Data

US 2012/0042370 A1 Feb. 16, 2012

(30) Foreign Application Priority Data

Aug. 12, 2010 (KR) ........................ 10-2010-0077763

(51) Int. Cl.
*H04L 9/32* (2006.01)
*G06F 21/34* (2013.01)
*G06F 21/30* (2013.01)
*G06F 21/35* (2013.01)

(52) U.S. Cl.
CPC .............. *G06F 21/34* (2013.01); *G06F 21/305* (2013.01); *G06F 21/35* (2013.01); *G06F 2221/2111* (2013.01); *G06F 2221/2115* (2013.01); *G06F 2221/2147* (2013.01); *G06F 2221/2153* (2013.01)

(58) Field of Classification Search
CPC ....... G06F 21/305; G06F 21/34; G06F 21/35; G06F 2221/2153; G06F 2221/2115; G06F 2221/2147; G06F 2221/2111
See application file for complete search history.

(56) References Cited

U.S. PATENT DOCUMENTS

| 6,871,063 | B1 | 3/2005 | Schiffer | |
|---|---|---|---|---|
| 2008/0016557 | A1* | 1/2008 | Yang | 726/9 |
| 2008/0295159 | A1* | 11/2008 | Sentinelli | 726/6 |
| 2010/0235900 | A1* | 9/2010 | Robinton et al. | 726/9 |

FOREIGN PATENT DOCUMENTS

| DE | 102008017630 | 10/2009 |
|---|---|---|
| GB | 2394327 | 4/2004 |
| WO | 0221763 | 3/2002 |
| WO | 2004031920 | 4/2004 |

OTHER PUBLICATIONS

European Search Report Issued on Jan. 13, 2012 in EP Patent Application No. 11175152.5.

* cited by examiner

*Primary Examiner* — Brandon Hoffman
*Assistant Examiner* — Nega Woldemariam
(74) *Attorney, Agent, or Firm* — Staas & Halsey LLP

(57) ABSTRACT

A computer system includes a first communication unit which communicates with an authentication module storing preset first authentication information, a second communication unit which is connected with a server through a network, the server storing preset second authentication information, a main board unit which implements a preset first operation of a computer, and a controller which receives the first authentication information from the authentication module through the first communication unit, receives the second authentication information corresponding to the first authentication information from the server through the second communication unit, and controls the main board unit to block implementation of the first operation when at least one of the first authentication information and the second authentication information is not received.

22 Claims, 6 Drawing Sheets

COMPUTER SYSTEM AND METHOD OF CONTROLLING COMPUTER

REFERENCE TO RELATED APPLICATIONS

This application claims priority under 35 U.S.C. §119 from Korean Patent Application No. 10-2010-0077763, filed on Aug. 12, 2010 in the Korean Intellectual Property Office, the disclosure of which is incorporated herein by reference in its entirety.

BACKGROUND

1. Field of the Invention

Apparatuses consistent with the exemplary embodiments relate to a computer system connected to a server through a network and a method of controlling a computer, and more particularly, to a computer system having an improved authentication structure for security when a computer is used, and a method of controlling a computer.

2. Description of the Related Art

A computer includes a central processing unit (CPU) to carry out the instructions of a computer program, a memory to store data, and a main board on which option boards corresponding to various functions to assist the CPU are mounted, such as a graphic card, and implements various applications desired by a user in a software operating system (OS). The computer may be configured as various forms, for example a desktop, a laptop, and a pad for ordinary people.

Developments in technology enable a computer to become smaller and light, and thus there are an increasing number of computers easily carried by users. However, as computers having enhanced portability increase, there is a demand for measures to prevent a computer theft, A computer generally stores user's private or important data. An efficient measure for security is preventing an unauthorized person, other than a user, from accessing the data stored in the computer when the computer is stolen.

Conventionally, when an authentication module storing authentication information about a user is mounted on the computer, the computer locked is released to use the computer. However, when the computer is stolen with the authentication module being mounted on the computer, an unauthorized person, other than a user, accesses data stored in the computer without any limitation.

SUMMARY

Accordingly, one or more exemplary embodiments provide a computer system which has an improved authentication structure for use of a computer to prevent an unauthorized person, other than a user, from using the computer, and a method of controlling a computer.

One or more exemplary embodiments provide a computer system and a method of controlling a computer.

Additional aspects and utilities of the present general inventive concept will be set forth in part in the description which follows and, in part, will be obvious from the description, or may be learned by practice of the present general inventive concept.

The foregoing and/or other features and utilities of the present general inventive concept may be achieved by providing a computer system including: a first communication unit which communicates with an authentication module storing preset first authentication information; a second communication unit which is connected with a server through a network, the server storing preset second authentication information; a main board unit which implements a preset first operation of a computer; and a controller which receives the first authentication information from the authentication module through the first communication unit, receives the second authentication information corresponding to the first authentication information from the server through the second communication unit, and controls the main board unit to block implementation of the first operation when at least one of the first authentication information and the second authentication information is not received.

The computer system may further include a communication module on which the authentication module is mounted to enable wireless communication with the first communication unit, wherein the first communication unit communicates with the authentication module mounted on the communication module when the communication module is positioned within a predetermined distance from the first communication unit.

The first communication unit may include a connection unit on which the authentication module is mounted, and the controller may access the authentication module mounted on the connection unit or the communication module.

The authentication module may further include settings information referred to when the main board unit operates, and the controller may update the settings information based on an operation of the main board unit when the controller accesses the authentication module.

The controller may receive the first authentication information and the second authentication information when the main board unit is booted.

The controller may receive the first authentication information and the second authentication information at a predetermined periodical point while the main board unit is turned on.

The main board unit may receive a first control signal and a second control signal from the controller and do not implement the first operation when the second control signal is received or the first control signal is not received for a preset period of time, the first control signal instructing that implementation of the first operation is allowed and the second control signal instructing that the implementation of the first operation is blocked.

The first operation may include at least one of system booting, implementation of an operating system, user login, connection to an inside component or an external device connected to the main board unit, and implementation of a preset application.

The authentication module may include a universal integrated circuit card (UICC).

The foregoing and/or other features and utilities of the present general inventive concept may also be achieved by providing a method of controlling a computer, the method including: receiving preset first authentication information from an authentication module outside the computer; connecting to a server storing preset second authentication information through a network and receiving the second authentication information corresponding to the received first authentication information; and blocking implementation of a preset first operation of the computer when at least one of the first authentication information and the second authentication information is not received.

The receiving the first authentication information may include wirelessly accessing the authentication module when the authentication module is positioned within a predetermined distance from the computer.

The receiving the first authentication information may further include accessing the authentication module when the authentication module is connected to the computer through a wire.

The receiving the second authentication information may be performed when the computer is booted.

The receiving the second authentication information may be performed at a predetermined periodical point while the computer is turned on.

The first operation may include at least one of system booting, implementation of an operating system, user login, connection to an inside component or an external device connected to the main board unit, and implementation of a preset application.

According to exemplary embodiments of the present general inventive concept, first authentication information is received from an authentication module, second authentication information corresponding to the first authentication information is received from a server, and implementation of a preset operation of the computer is blocked when at least one of the first authentication information and the second authentication information is not received, so that an unauthorized person is prevented from using the computer to improve security of the computer.

According to exemplary embodiments of the present general inventive concept, as the second authentication information corresponding to the first authentication information is received via connection to the server, the server just blocks access to the first authentication information in the authentication module to prevent use of the computer even though both the computer and the authentication module are stolen.

According to exemplary embodiments of the present general inventive concept, an authentication process is performed when the computer is booted, that is, before an operating system operates, so that use of the computer may be limited in a low-level aspect of the computer.

According to exemplary embodiments of the present general inventive concept, the authentication process is performed periodically while the computer operates, thereby improving security of the computer.

According to exemplary embodiments of the present general inventive concept, the authentication module is mounted on and applied to a communication module which performs wireless communication with the computer within a predetermined distance, and thus an unauthorized person is prevented from using the computer without a user mounting on or detaching from the authentication module in the computer.

The foregoing and/or other aspects features and utilities of the present general inventive concept may also be achieved by providing a computer system including a main board unit to perform an operation, an authentication module having first authentication information, and a controller to determines whether the main board unit performs the operation according to an accessibility to access the authentication module, a first receiving state to receive first authentication information from the authentication module, and a second receiving state to receive second authentication information.

The controller may recognize the first authentication information and the second authentication information to determine whether the main board unit performs or blocks the operation.

The controller may control the main board unit to block the operation according to the accessibility of the authentication module after controlling the main board unit to perform the operation according to the accessibility, the first receiving state, and the second receiving state.

The controller may control the main board unit to block the operation according to a non-accessibility of the authentication module regardless of existence of the first authentication information and the second authentication information.

The authentication module may further include one or more user settings corresponding to one or more operations of the main board unit, and the controller may control the main board unit to set one or more items of the one or more operations according to the one or more user settings when confirming the accessibility, the first authentication information, and the second authentication information.

The controller may control the operation of the main board unit according to the accessibility, the first authentication information, and the second authentication information at an initial stage, and the controller controls the operation of the main board unit according to the accessibility regardless of the first receiving state and the second receiving state.

The controller may control the operation of the main board unit according to the accessibility, the first authentication information, and the second authentication information when the controller is turned on. The controller may also control the operation of the main board unit according to the accessibility after controlling the main board unit according to the accessibility, the first authentication information, and the second authentication information.

The controller may control the operation of the main board unit according to a first condition including the accessibility, the first receiving state, and the second receiving state, and may also control the operation of the main board unit according to a second condition including the accessibility with the received first authentication information and the received second authentication information.

BRIEF DESCRIPTION OF THE DRAWINGS

The above and/or other aspects of the present general inventive concept will become apparent and more readily appreciated from the following description of the exemplary embodiments, taken in conjunction with the accompanying drawings, in which:

FIG. 5 is a flowchart illustrating a process in which the computer periodically performs selective allowance and blocking of implementation of the preset first operation while the computer system of FIG. 1 is turned on.

DETAILED DESCRIPTION OF THE EMBODIMENTS

Figure 1:
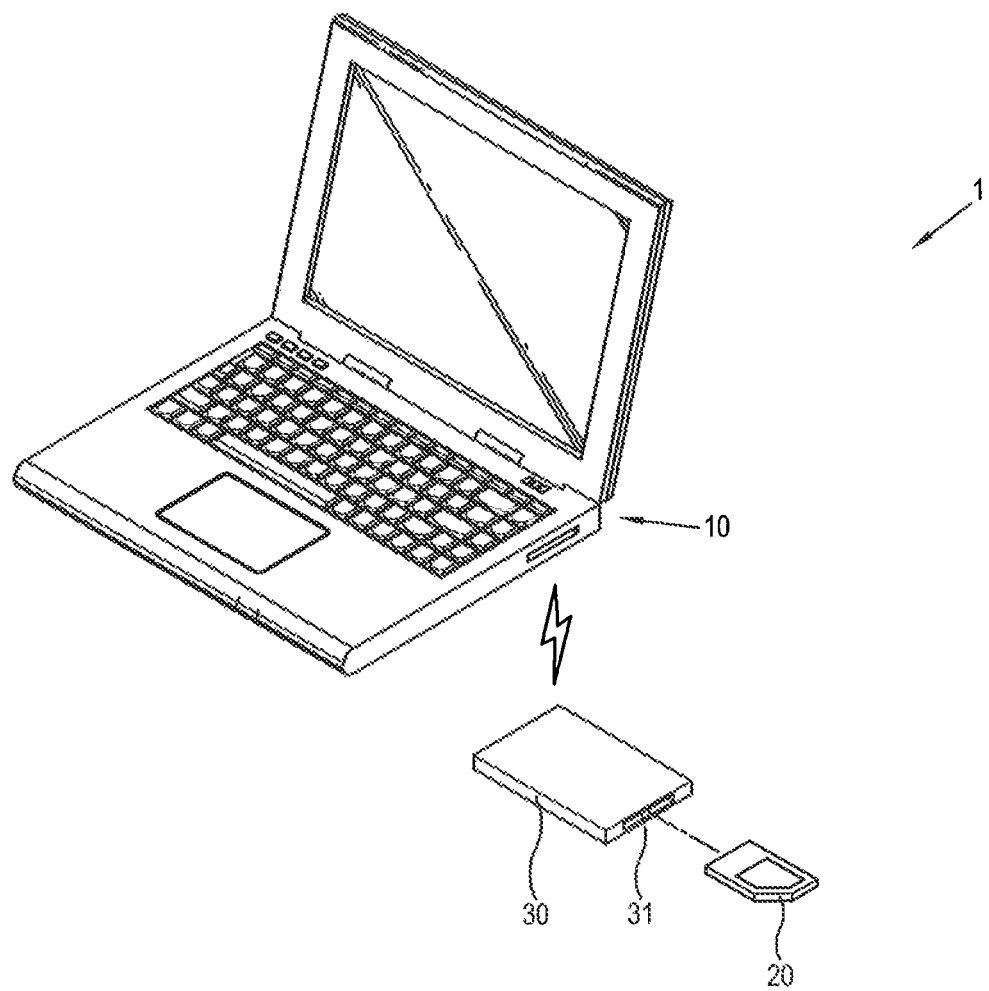
FIG. 1 illustrates an example of a computer system according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures. However, it is appreciated that it is not meant to exclude such omitted components from a computer system 1 to which the spirit of the exemplary embodiments of the present general inventive concept are applied.

FIG. 1 illustrates an example of a computer system 1 according to an exemplary embodiment of the present general inventive concept.

As illustrated in FIG. 1, the computer system 1 according to the present embodiment includes a computer body 10, an authentication module 20 to store preset authentication information about a user, and a communication module 30 on which the authentication module 20 is mounted and which enables near field communication (NFC) with the computer body 10.

The computer body 10 according to the present embodiment may be illustrated with a portable lap-top computer, but is not limited thereto. The present embodiment may be applied to various types of computer bodies 10, such as a pad-type computer body, a mobile phone, a portable media player, etc., and to a desktop computer.

The authentication module 20 includes a memory (not illustrated) to store the preset authentication information and performs outputting and updating the authentication information corresponding to an external access. The authentication module 20 may have a form of a card, a stick, or a bar and be realized as a universal integrated circuit card (UICC) or a universal subscriber identity module (USIM).

Here, the authentication information stored in the authentication module 20 may include an encoded user authentication code and various types of information such as user settings in the computer body 10, but may not be limited thereto, In the following embodiments, the authentication information stored in the authentication module 20 is referred to as first authentication information, but it should be noted that the term is used for convenience of description of embodiments.

The communication module 30 may be carried by a user and performs NFC with the computer body 10. That is, the communication module 30 communicates with the computer body 10 within a predetermined distance from the computer body 10. Thus, the communication module 30 may perform wireless communication based on various communication standards, for example, radio frequency (RF) communication such as active RF identification (RFID), Bluetooth, ultra wideband, and the like.

The communication module 30 includes a module connection unit 31 in which the authentication module 20 is detachably mounted through one side, and a micro-controller unit (MCU, not illustrated) to control the authentication information in the authentication module 20 mounted on the module connection unit 31 The communication module 30 includes a battery (not illustrated) therein to supply power to the MCU and the authentication module 20.

When the authentication information stored in the authentication module 20 is an encoded user authentication code, the computer body 10 may have a unit to decode the encoded user authentication code to use the decoded user authentication code as the first authentication information.

When the authentication module 20 is in a position (state) to communicate with the computer body 10, the computer body 10 can check a continuation state of the communication therebetween or periodically monitor an access state of the authentication module 20, such that the computer body 10 can perform interrupting a current operation, interrupting a next operation, preventing accessing the computer body 10, terminating communicating with a user through any input unit, generating a signal to control a display unit (not illustrated) connected to the computer body 10 or installed in the computer body to turn off an image displayed thereof or to not display the image a screen of the display unit, etc.

Accordingly, when a user carrying the authentication module 20 is close to the computer body 10 to provide the communication state or the access state between the authentication module 20 and the computer body 10, the computer body 10 can complete a current operation, continue a next operation, an accessing operation the computer body 10, providing communicating with a user through any input unit, preventing a signal from being generated to maintain a display state of the image, etc. When a user carrying the authentication module is stay away from the computer body, 10 through the communication state or the access state, the computer body 10 determines that the authentication module 20 is not in a position (state) to communicate with the computer body 10. Therefore, an operation performed or to be performed in the computer body 10 can be affected according to a determination of whether the authentication module 20 is in the communication state or the access state.

The operation of outputting and updating the authentication information can be affected according to the determination of whether the authentication module 20 is in the communication state or the access state.

It is possible that a predetermined period of time can be set in the computer body 10 so that the computer body 10 can perform a desired operation, for example, the above-describe operations, the predetermined period of time after a determination of whether the authentication module 20 is in the communication state or the access state. It is also possible that the computer body 10 can perform the desired operation immediately without waiting the period of time according to a determination of whether the authentication module 20 is not in the communication state or the access state.

Figure 2A:
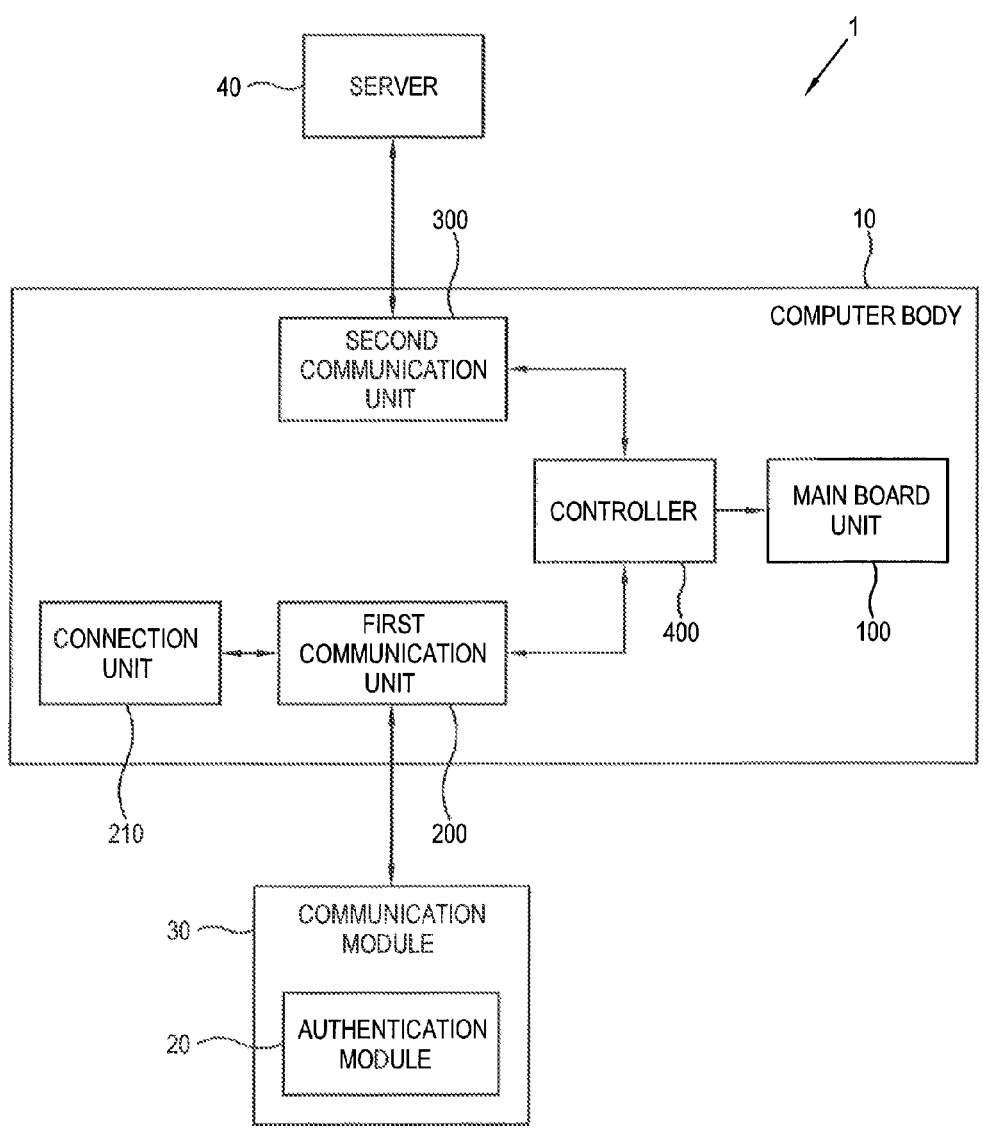
FIGS. 2A and 2B are block diagrams of the computer system of FIG. 1.

Hereinafter, a configuration of the computer system 1 is further described with reference to FIG. 2A. FIG. 2A is a block diagram illustrating the configuration of the computer system 1.

As illustrated in FIG. 2A, the computer body 10 includes a main board unit 100 to perform various functional operations of the computer body 10, a first communication unit 200 to communicate with the communication module 30 through a wired or wireless communication line, a second communication unit 300 to communicate with a server 40 through a wired or wireless communication line, and a controller 400 to access the communication module 30 and the server 40 through the first communication unit 200 and the second communication unit 300, respectively, and to transmit a preset control signal to the main board unit 100 based on a result of the access.

In the present embodiment, the first communication unit 200, the second communication unit 300, and the controller 400 are described as separate components, but not limited thereto. The first communication unit 200, the second communication unit 300, and the controller 400 may be integrated into a single interface unit or be mounted on the same printed circuit board (PCB, not shown) as the main board unit 100.

The main board unit 100 is provided in the computer body 10 and performs preset operations of the computer board 10. The main board unit 100 includes a hardware configuration in which various chip sets (not shown) including a central processing unit (CPU, not shown) and components, such as a memory (not shown) and an option board (not shown), are mounted on the PCB. The main board unit 100 drives an operating system (OS) and a variety of applications using the hardware configuration.

The preset operations of the computer board 10 performed by the main board unit 100 may be designated variously, for example, system booting, implementation of the OS, user login after the implementation of the OS, connection to a component in the main board unit 100, connection to an external device (not illustrated) connected to the main board unit 100, implementation of an application, and the like.

The first communication unit 200 performs wireless communication with the communication module 30 positioned within a communicating distance from the computer body 10. The first communication unit 200 enables the controller 400 to access the authentication module 20 when the first communication unit 200 communicates with the communication module 30. The first communication unit 200 continues to monitor whether there is the communication module 30 within the communicating distance and performs communication with the communication module 30.

Alternatively, a user input unit (not illustrated) is provided to turn on/off communication between the first communication unit 200 and the communication module 30 so that a user carrying the communication module 30 manipulates the user input unit to enable communication between the first communication unit 200 and the communication module 30.

The user input unit may be connected to the controller 400 or the main board unit 100 to generate signals for the communication or commands for changing the user setting according to the access to the authentication module 20 or a controlling the controller 400 or the first communication unit 200, The user input unit may be connected to the communication module 30 to provide the signals or the commands before or after transmission of the authentication information between the authentication module 20 and the controller 400 or the first communication unit 200.

Figure 2B:
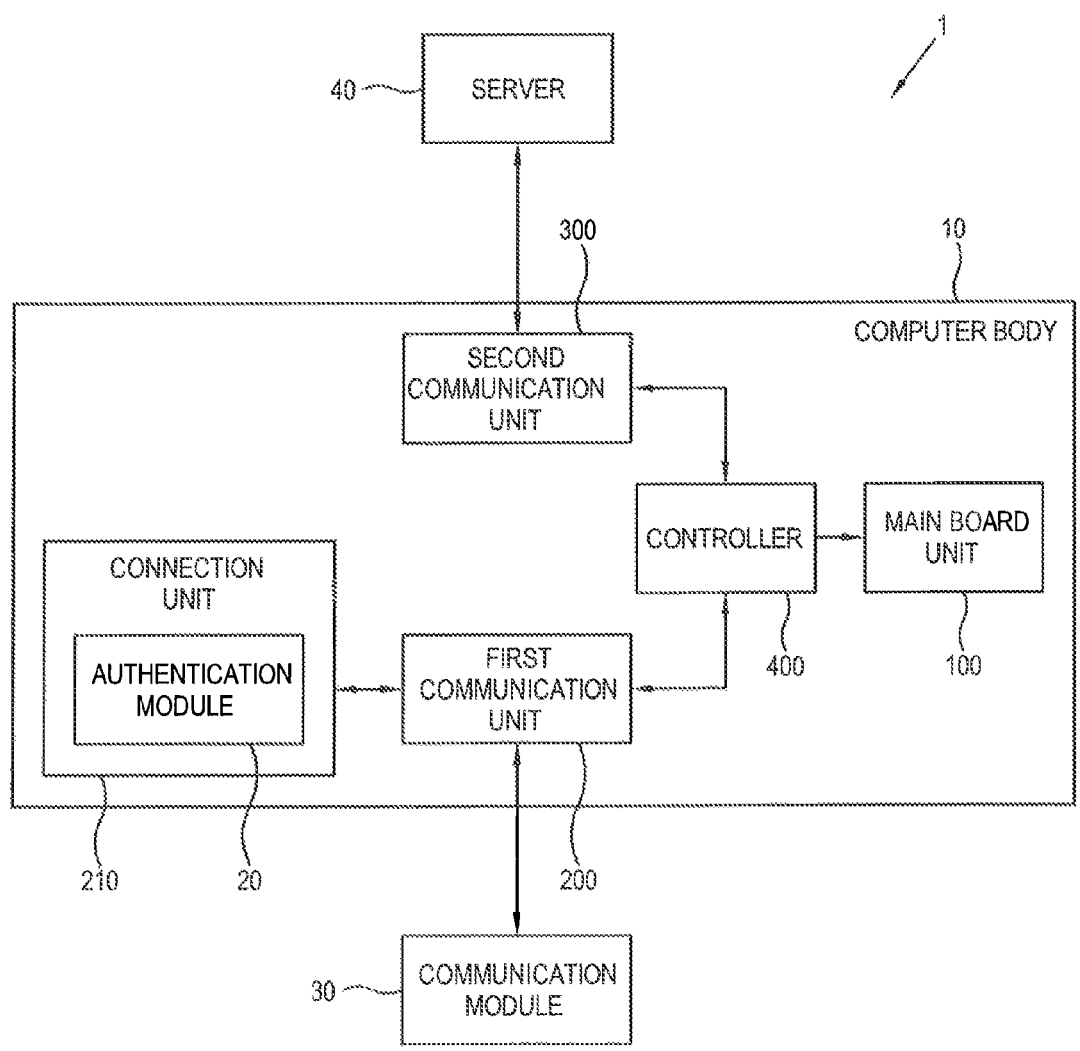

The first communication unit 200 includes a connection unit 210 installed in the computer body 10. The connection unit 210 is provided to enable the authentication module 20 to be mounted, and thus the authentication module 20 may be mounted on the communication module 30 or may be mounted on the connection unit 210, as shown in FIG. 2B. The first communication unit 200 may enable the controller 400 to access the first authentication information in the authentication module 20 when the authentication module 20 is mounted on the communication module 30 or on the connection unit 210.

The second communication unit 300 is connected to the server 40 through a wire/wireless network. The server 40 stores preset second authentication information, and the second authentication information corresponds to the first authentication information, The server 40 may store a plurality of second authentication information, and each of the second authentication information corresponds to each of a plurality of first authentication information. Here, the second authentication information is just a term designated to be distinguished from the first authentication information, and includes various encoded codes but is not limited thereto.

The second authentication information may have one or more characteristics corresponding to the one or more characteristics of the first authentication information. The first authentication information and the second authentication information may be encoded codes to be decoded by the controller 400 to see if the decoded codes correspond to each other. The first authentication information may be a first portion of a combination and the second authentication information may be a second portion of the combination. However, the present general inventive concept is not limited thererto. The first authentication information and the second authentication information may be information to be recognized by the controller 400 as to whether a user holding the authentication module 20 is an authenticated user or the authentication module 20 is an authenticated module. The controller 400 may have a storage unit to store the first authentication information and the second authentication information and a determining unit to determine whether the second authentication information corresponds to the first authentication information.

The second communication unit 300 transmits preset first authentication information to the server 40 by control of the controller 400, and receives second authentication information corresponding to the transmitted first authentication information from the server 40 and transmits the second authentication information to the controller 400.

The controller 400 accesses the authentication module 20 through the first communication unit 200 and accesses the server 40 through the second communication unit 300. The controller 400 accesses the authentication module 20 and the server 40 at a preset time to receive the first authentication information and the second authentication information and outputs a control signal corresponding to a reception result to the main board unit 100.

The preset time at which the controller 400 is allowed to access the authentication module 20 and the server 40 may be designated variously. For example, the preset time may be a time when a system of the computer body 10 is booted, that is, when the main board unit 100 is turned on, or may be a predetermined periodical time while the computer body 10, particularly the main board unit 100, is turned on.

The first communication unit 200 may output a signal such that the authentication module 20 receives the output signal and then output a response signal to the first communication unit 200 to initiate a process to access the first authentication information. It is possible that the authentication module 20 can output a signal such that the first communication unit 200 receives the output signal and then output a response signal to the authentication module 20 to initiate a process to access the first authentication information.

When the controller 400 receives the first authentication information from the authentication module 20, the controller 400 requests the server 400 to provide the second authentication module 20. Therefore, the controller 400 performs checking of a status of the authentication module 20. The status of the authentication module 20 includes a combination of whether the controller 400 or the computer body 10 is turned on and whether the authentication module 20 is disposed in communication with the controller 400 or the first communication unit 200. Accordingly, the preset time or the predetermined periodical time may not be variable. However, it is possible that the preset time or the predetermined periodical time may be variable or reset according the user setting, a new user request, or a determination of the controller 400.

Once the controller 400 receives the second authentication information, the controller 400 can store the second authentication information in the storage unit until the controller 400 or the computer body 10 is turned off or until any change or information about the first authentication information an/or the second authentication information is performed. In this case, when the authentication module 20 is away from or detached from the computer body 10 during a turning-on state of the controller 400 or the computer body 10, the controller 400 may not request the second authentication information to the server 40 but use the stored second authentication information. However, the present general inventive concept is not limited thereto. It is possible that the controller 400 accesses to receive the first authentication information a first number of time and the second authentication information a second number of time. The first number of time may be the same as the second number of time. It is possible that the first number of time may be different from the second number of time. It is also possible that the first number of time may be greater than the second number of time.

Figure 3:
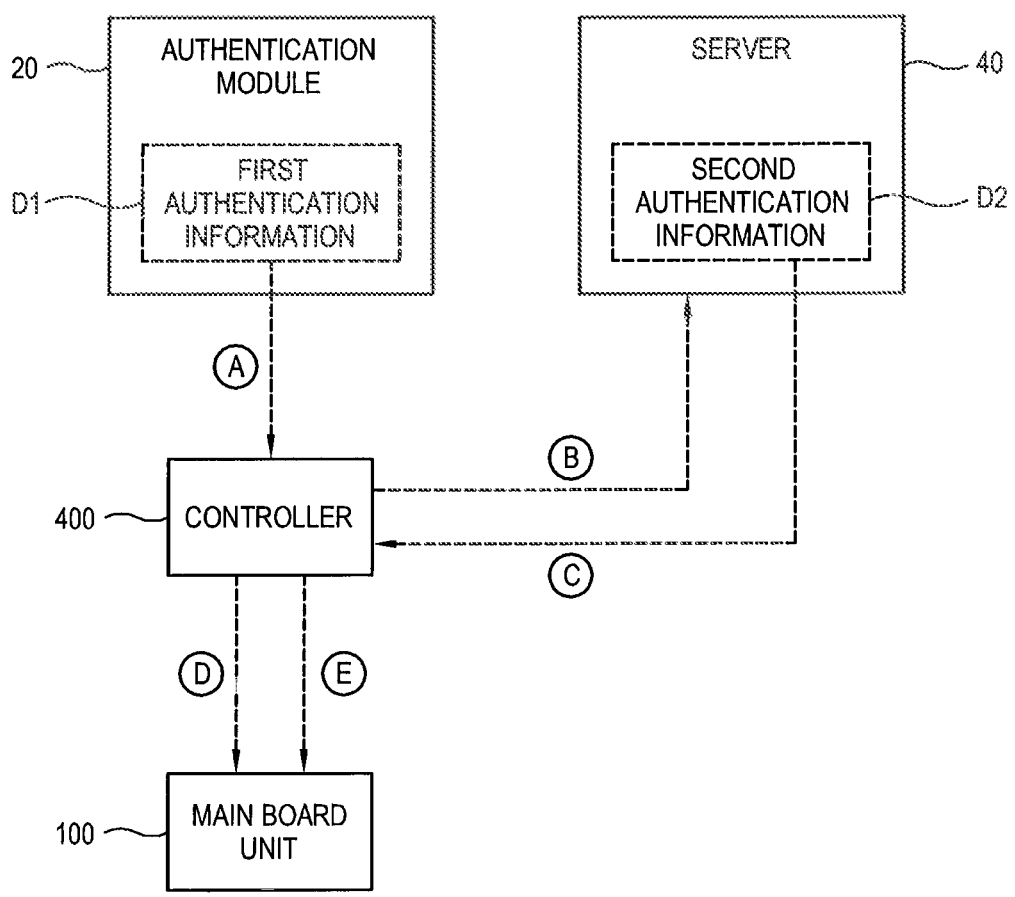
FIG. 3 is a conceptual view illustrating a control operation of a controller of a computer body of FIGS. 2A and 2B.

Hereinafter, a control operation of the controller 400 is described further with reference to FIG. 3. FIG. 3 is a conceptual view illustrating the control operation of the controller 400.

As shown in FIG. 3, the controller 400 accesses the authentication module 20 mounted on the communication module 30 or the connection unit 210 at a preset time. The controller 400 receives first authentication information D1 stored in the authentication module 20 in operation A.

When the first authentication information D1 is received, the controller 400 transmits the first authentication information D1 to the server 40 and requests second authentication information D2 corresponding to the first authentication information D1 from the server 40 in operation B. Here, the controller 400 determines whether the first authentication information is adequate authentication information between operation A and operation B.

The controller 400 receives the second authentication information D2 corresponding to the first authentication information D1 from the server 40 in operation C. The controller 400 may determine whether the second authentication information D2 is adequate (proper, required, or desired) authentication information. Alternatively, when the server 40 determines in advance that the second authentication information D2 corresponding to the first authentication information D1 is identified as adequate authentication information while the second authentication information D2 is selected, the process of determining whether the second authentication information D2 is adequate authentication information by the controller 400 may be omitted.

When the first authentication information D1 and the second authentication information D2 are received in a state where operation C is completed, the controller 400 transmits a first control signal instructing that implementation of a preset first operation of the main board unit 100 is allowed to the main board unit 110 in operation D. Here, the first operation is designated for convenience to refer to at least one of various functional operations of the computer body 10 implemented by the main board unit 100, but the term does not limit the scope of the present embodiment. Further, the first operation may be a single functional operation or a plurality of functional operations, and may be modified variously. Hereinafter, the first operation includes the above operations.

When the first control signal is received, the first main board unit 100 implements the first operation.

When at least one of the first authentication information D1 and the second authentication information D2 is not received through the above operations, the controller 400 transmits a second control signal instructing that implementation of the first operation of the main board unit 100 is blocked in operation E. In detail, the controller 400 performs operation E, when the first authentication information D1 is not received from the authentication module 20 in operation A, when the received first authentication information D1 is identified as inadequate authentication information, when the controller 400 does not access the server 40 in operation B, when the second authentication information D2 is not received from the server 40 in operation C, or when the controller 400 receives notice from the server 40 that there is no second authentication information D2 corresponding to the first authentication information D1.

When the second control signal is received, the main board unit 100 does not perform the first operation. Further, the main board unit 100 may generate a signal to inform a user that implementation of the first operation is blocked through a display unit (not shown) or a speaker (not shown).

With the above configuration, the computer system 1 according to the present embodiment may be improved in security.

For example, the authentication module 20 mounted on the communication module 30 is carried by the user, and thus the user may not need to mount and detach the authentication module 20 on and from the computer body 10 in order to use the computer body 10 and to terminate use of the computer body 10. Further, when the control operation of the controller 400 is performed periodically while the system of the computer body 10 is turned on, an unauthorized user is prevented from using the computer body 10 while the user is absent with the computer body 10 being turned on.

Alternatively, when the communication module 30 and the computer body 10 on which the authentication module 20 is mounted are stolen, the user may contact an administrator of the server 40 to request blocking the first authentication information D1 in the stolen authentication module 20. When an unauthorized user accesses the server 40 using the first authentication information D1 in the authentication module 20 to use the computer body 10, the server 40 just blocks the first authentication information D1 to prevent use of the computer body 10.

The first operation may be a display operation, a user signal input operation, a communication operation with an external apparatus, an image forming or processing operation, and so on. For example, the computer body 20 is a mobile phone or mobile computer, the mobile phone turns off the display operation and then turns on the display operation when the controller 400 can access the authentication module 20 to receive the first authentication information and/or the second authentication information.

It is possible that when the display operation includes displaying a plurality of icons on a screen of a display panel to correspond to operations of the main board unit 100, the main board unit 100 can disable at least one of the icons according to accessibility of the authentication module 20, existence of the first authentication information, and/or existence of the second authentication information.

As described above, according to the present embodiment, using the authentication module 20 storing the first authentication information D1 and the server 40 storing the second authentication information D2 corresponding to the first authentication information D1, implementation of the preset first operation is blocked when at least one of the first authentication information D1 and the second authentication information D2 is not transmitted to the computer body 10, Thus, an unauthorized user is prevented from using the computer body 10, thereby improving security.

In the above embodiment, the first control signal and the second control signal are designated just for convenience to be distinguished from each other, and thus the terms do not limit the scope of the embodiment. The first control signal and the second control signal may be changed variously in configuration, For example, the first control signal and the second control signal may be a general purpose input/output (GPIO) signal and be output to the main board unit 100 from the controller 400.

Figure 4:
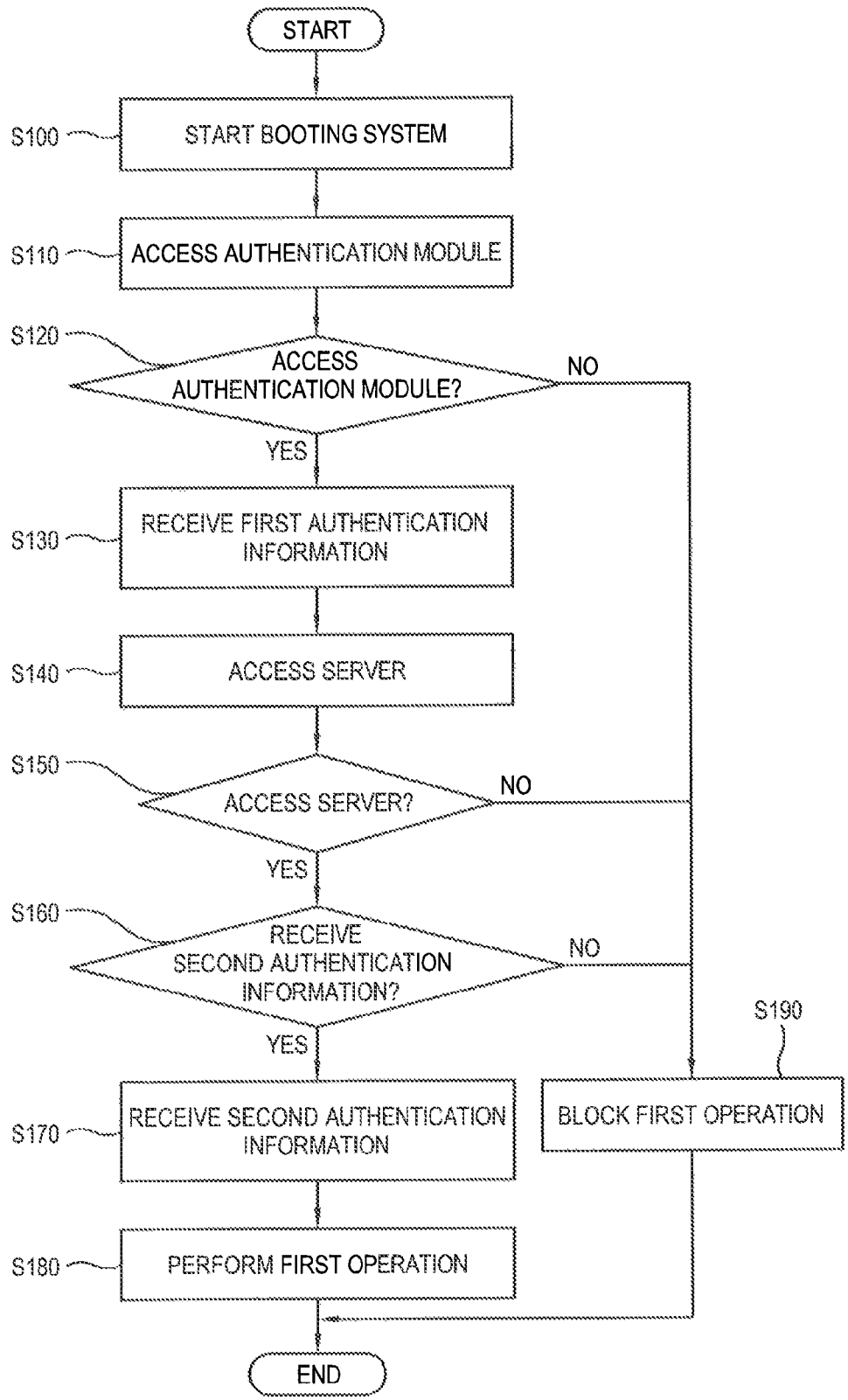
FIG. 4 is a flowchart illustrating a process in which a computer selectively allows and blocks implementation of a preset first operation when the computer system of FIG. 1 is booted.

Hereinafter, a process in which the computer body 10 selectively allows and blocks implementation of the first operation when the system of the computer body 10 is booted is described with reference to FIG. 4. FIG. 4 is a flowchart illustrating the process.

As illustrated in FIG. 4, when the system of the computer body 10 starts booting in operation S100, the controller 400 performs an operation to access the authentication module 20 in operation S110. When the controller 400 accesses the authentication module 20 in operation S120, the controller 400 receives first authentication information from the authentication module 20 in operation S130.

When the first authentication information is received, the controller 400 tries to access the server 40 in operation S140. When the controller 400 accesses the server 40 in operation S150, the controller 40 identifies whether second authentication information corresponding to the first authentication information may be received in operation S160. When reception of the second authentication information is possible, the controller 400 receives the second authentication information from the server 40 in operation S170.

When all of the first authentication information and the second authentication information are received, the controller 400 allows the first operation to be implemented. Accordingly, the main board unit 100 performs the first operation in operation S180.

Here, when the controller 400 does not access the authentication module 20 in operation S120, when the controller 400 does not access the server 40 in operation S150, and when the second authentication information is not received from the server 40 in operation S160, the controller 400 blocks implementation of the first operation of the main board unit 100 in operation S190.

Figure 5:
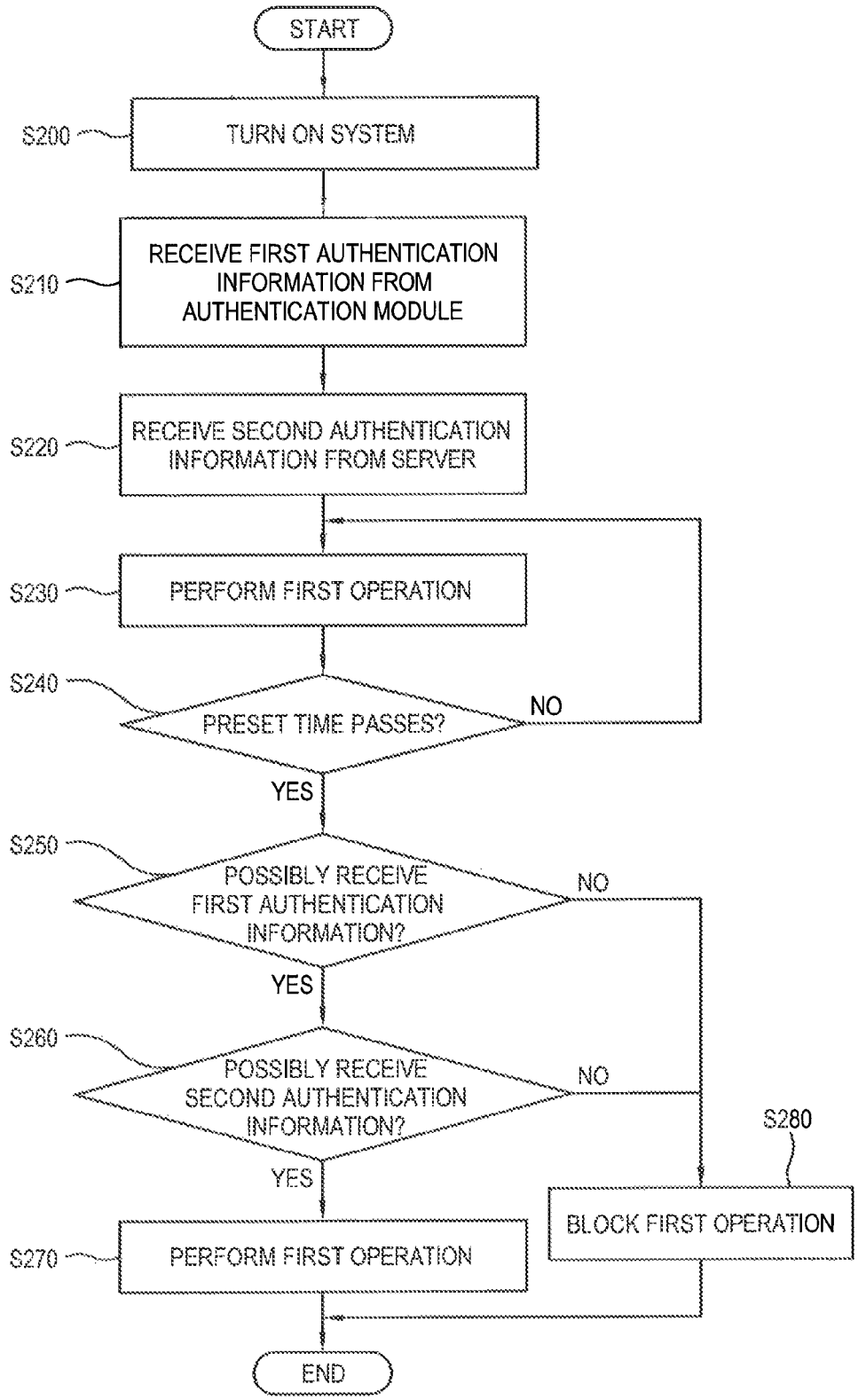

Hereinafter, a process in which the computer body 10 periodically performs selective allowance and blocking of implementation (performing) of the first operation while the computer body 10 is turned on is described with reference to FIG. 5. FIG. 5 is a flowchart illustrating the process.

As illustrated in FIG. 5, when the system of the computer body 10 is turned on in operation S200, the controller 400 receives first authentication information from the authentication module 20 in operation S210 and receives second authentication information corresponding to the first authentication information from the server 40 in operation S220.

When the first authentication information and the second authentication information are received, the controller 400 allows the first operation to be implemented, and accordingly the main board unit 100 performs the first operation in operation S230.

Then, the controller 400 monitors whether preset time passes from a point at which the first operation starts to be implemented in operation S240.

With lapse of the preset time, the controller 400 tries to receive the first authentication information from the authentication module 20 in operation S250. When reception of the first authentication information is possible, the controller 400 tries to receive the second authentication information from the server 40 in operation S260.

When reception of the second authentication information is possible, the controller 400 allows the first operation to continue to be implemented in operation S270.

Here, when the reception of the first authentication information is not possible in operation S250, or when the reception of the second authentication information is not possible in operation S260, the controller 400 blocks implementation of the first operation, and accordingly the main board unit 100 stops the implementation of the first operation in operation S280.

As described above, a periodical authorization process is performed on the computer body 10 authorized first while the computer body 10 is in use, and thus when access to at least one of the server 40 and the authentication module 20 is blocked in use of the computer body 10, the blocking of the access is detected to block use of the computer body 10.

The authentication module 20 may further include user settings information referred to when the main board unit 100 operates. The user settings information may be changed according to an operation of the main board unit 100 when a user uses the computer body 10. Thus, when the settings information is changed in the computer body 10, the controller 400 may update settings information about the authentication module 20 when the controller 400 accesses the authentication module 20.

The user setting information can include one or more items corresponding to operations of the controller 400, the main body 100, and/or the computer body 10. When the operations include a display operation, the item of the display operation may be one or a combination of a display turn-on or off operation, a brightness changing operation, a sleep mode operation, and so on, of a display unit (not illustrated), for example. When the operations include a user input related operation, the item of the user input related operation may be an all user key input disabling operation, a partial user key input disabling operation, a specific user key disabling operation and so on, of the user input unit, for example.

The settings information may be designated variously and does not limit the scope of the present embodiment. The settings information may include login information, information about a basic input/output system (BIOS), password information to implement applications, and the like.

The communication module 30 on which the authentication module 20 is mounted may include a preset payment means, that is, an electronic payment means. The electronic payment means may be used to make payment in various occasions, such as for the use of transportation. Thus, the communication module 30 carried by a user may be improved in utility.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present invention have been shown and described, it would be appreciated by those skilled in the art that changes may be made in these embodiments without departing from the principles and spirit of the general inventive concept, the scope of which is defined in the claims and their equivalents.

What is claimed is:

1. A computer system comprising:
a first communication unit to communicate with an authentication module storing preset first authentication information;

a second communication unit to be connected with a server through a network, the server storing preset second authentication information;
a main board unit which implements a reset first operation of a computer; and
a controller to receive the first authentication information from the authentication module through the first communication unit, to receive the second authentication information corresponding to the first authentication information from the server through a second communication unit, and to control the main board unit to block implementation of the first operation when at least one of the first authentication information and the second authentication information is not received,
wherein the authentication module further comprises settings information referred to when the main board unit operated, and the controller updates the settings information based on an operation of the main board unit when the controller accesses the authentication module.

2. The computer system of claim 1, further comprising:
a communication module on which the authentication module is mounted to enable wireless communication with the first communication unit, wherein the first communication unit communicates with the authentication module mounted on the communication module when the communication module is positioned within a predetermined distance from the first communication unit.

3. The computer system of claim 2, wherein the first communication unit comprises a connection unit on which the authentication module is mounted, and the controller accesses the authentication module mounted on the connection unit or the communication module.

4. The computer system of claim 1, wherein the controller receives the first authentication information and the second authentication information when the main board unit is booted.

5. The computer system of claim 1, wherein the controller receives the first authentication information and the second authentication information at a predetermined periodical point while the main board unit is turned on.

6. The computer system of claim 5, wherein the main board unit receives a first control signal and a second control signal from the controller and does not implement the operation when the second control signal is received or the first control signal is not received for a period of time, the first control signal instructing that implementation of the operation is allowed and the second control signal instructing that the implementation of the operation is blocked.

7. The computer system of claim 1, wherein the operation comprises at least one of system booting, implementation of an operating system, user login, connection to an inside component or an external device connected to the main board unit, and implementation of a preset application.

8. The computer system of claim 1, wherein the authentication module comprises a universal integrated circuit card (UICC).

9. A method of controlling a computer system, the method comprising:
receiving first authentication information from an authentication module outside the computer system;
connecting to a server storing second authentication information through a network and receiving the second authentication information corresponding to the received first authentication information; and
blocking implementation of an operation of the computer system unless a signal corresponding with reception of the first authentication information and the second authentication information is received,
wherein the authentication module further comprises settings information referred to when the computer system operates, and the controller updates the settings information based on the operation of the computer system when the controller accesses the authentication module.

10. The method of claim 9, wherein the receiving the first authentication information comprises wirelessly accessing the authentication module when the authentication module is positioned within a predetermined distance from the computer system.

11. The method of claim 10, wherein the receiving the first authentication information further comprises accessing the authentication module when the authentication module is connected to the computer system through a wire.

12. The method of claim 9, wherein the receiving the second authentication information is performed when the computer system is booted.

13. The method of claim 9, wherein the receiving the second authentication information is performed at a predetermined periodical point while the computer system is turned on.

14. The method of claim 9, wherein the operation comprises at least one of system booting, implementation of an operating system, user login, connection to an inside component or an external device connected to the main board unit, and implementation of an application.

15. A computer system comprising:
a main board unit to perform an operation;
an authentication module having first authentication information; and
a controller to determines whether the main board unit performs the operation according to an accessibility to access the authentication module, a first receiving state to receive first authentication information from the authentication module, and a second receiving state to receive second authentication information,
wherein the controller controls the main board to block the operation unless a signal corresponding with reception of the first authentication information and the second authentication information is received,
wherein the authentication module further comprises setting information referred to when the main board unit operated, and the controller updates the settings information based on the operation of the main board unit when the controller accesses the authentication module.

16. The computer system of claim 15, wherein the controller recognizes the first authentication information and the second authentication information to determine whether the main board unit performs or blocks the operation.

17. The computer system of claim 15, wherein the controller controls the main board unit to block the operation according to the accessibility of the authentication module after controlling the main board unit to perform the operation according to the accessibility, the first receiving state, and the second receiving state.

18. The computer system of claim 15, wherein the controller controls the main board unit to block the operation according to a non-accessibility of the authentication module regardless of existence of the first authentication information and the second authentication information.

19. The computer system of claim 15, wherein:
the controller controls the operation of the main board unit according to the accessibility, the first authentication information, and the second authentication information at an initial stage; and the controller controls the operation of the main board unit according to the accessibility regardless of the first receiving state and the second receiving state.

20. The computer system of claim 15, wherein:
the controller controls the operation of the main board unit according to the accessibility, the first authentication information, and the second authentication information when the controller is turned on; and
the controller controls the operation of the main board unit according to the accessibility after controlling the main board unit according to the accessibility, the first authentication information, and the second authentication information.

21. The computer system of claim 15, wherein the controller:
controls the operation of the main board unit according to a first condition including the accessibility, the first receiving state, and the second receiving state; and
controls the operation of the main board unit according to a second condition including the accessibility with the received first authentication information and the received second authentication information.

22. A computer system comprising:
a main board unit to perform an operation;
an authentication module having a first authentication information; and
a controller to determine whether the main board unit performs the operation according to an accessibility to access the authentication module, a first receiving state to receive first authentication information from the authentication module, and a second receiving state to receive second authentication information,
wherein the authentication module further includes one or more user settings corresponding to one or more operations of the main board unit; and
the controller controls the main board unit to set one or more items of the one or more operations according to the one or more user settings when confirming the accessibility, the first authentication information, and the second authentication information.

* * * * *

UNITED STATES PATENT AND TRADEMARK OFFICE
CERTIFICATE OF CORRECTION

| | |
|---|---|
| PATENT NO. | : 9,235,699 B2 |
| APPLICATION NO. | : 13/074174 |
| DATED | : January 12, 2016 |
| INVENTOR(S) | : Woon-geun Kwak |

It is certified that error appears in the above-identified patent and that said Letters Patent is hereby corrected as shown below:

Title Page

Item (73) Assignee:
Delete "LTD..," and insert -- LTD., --, therefor.

Claims

Column 13, Line 4, Claim 1
Delete "reset" and insert -- preset --, therefor.

Column 13, Line 10, Claim 1
Delete "a" and insert -- the --, therefor.

Column 13, Line 17, Claim 1
Delete "operated," and insert -- operates, --, therefor.

Column 13, Line 54, Claim 7
Delete "a preset" and insert -- an --, therefor.

Column 14, Line 33, Claim 15
Delete "determines" and insert -- determine --, therefor.

Column 14, Line 43-44, Claim 15
Delete "setting" and insert -- settings --, therefor.

Column 14, Line 45, Claim 15
Delete "operated," and insert -- operates, --, therefor.

Column 16, Line 5, Claim 22
Delete "a first" and insert -- first --, therefor.

Signed and Sealed this
Twenty-fourth Day of May, 2016

Michelle K. Lee
*Director of the United States Patent and Trademark Office*